(12) United States Patent
Cai

(10) Patent No.: US 7,544,735 B2
(45) Date of Patent: Jun. 9, 2009

(54) COATING SURFACE

(75) Inventor: Ru Xiong Cai, Singapore (SG)

(73) Assignee: Agency for Science Technology and Research, Singapore (SG)

( * ) Notice: Subject to any disclaimer, the term of this patent is extended or adjusted under 35 U.S.C. 154(b) by 71 days.

(21) Appl. No.: 10/927,830

(22) Filed: Aug. 27, 2004

(65) Prior Publication Data

US 2005/0049158 A1 Mar. 3, 2005

Related U.S. Application Data

(60) Provisional application No. 60/498,605, filed on Aug. 29, 2003.

(51) Int. Cl.
*C08L 83/04* (2006.01)
(52) U.S. Cl. .............................. 524/588; 528/12; 528/39
(58) Field of Classification Search .................... 528/12, 528/39; 524/588
See application file for complete search history.

(56) References Cited

U.S. PATENT DOCUMENTS 5,385,955 A * 1/1995 Tarshiani et al. ............... 522/31
5,958,514 A * 9/1999 Havey et al. ................. 427/386

OTHER PUBLICATIONS

Wang, R., et al., Light-induced Amphiphilic Surfaces, Nature, Jul. 31, 1997, pp. 431-432, v. 388.
Schmidt, H., Inorganic-Organic Composites by Sol-Gel . . . , Journal of Sol-Gel Science and Technology, 1994, pp. 217-231, v. 1, Kluwer Academic Publishers, The Netherlands.
Gautier-Luneau, I., et al., Sol-gel Processing and Structural Study . . . , Journal of Materials Science, 1990, pp. 3739-3745, v.25, Chapman and Hall Ltd.
Daniels, M.W., et al., Silane Adsorption Behavior, Microstructure, and Properties . . . , Journal of Colloid and Interface Science, 1998, pp. 191-200, v. 205, Academic Press.
Sopyan, I., et al., Highly Efficient TiO2 Film Photocatalyst . . . , Chemistry Letters, 1994, pp. 723-725, The Chemical Society of Japan, Japan.
Thiedman, W., et al., Silane Coupling Agents as Adhesion Promoters . . . , J. Adhesion, 1987, pp. 197-210, v. 22, Gordon and Breach Science Publishers, United Kingdom.
Horr, T.J. et al., The Reactions of 3-glycidoxypropyltrimethoxysilane . . . , J. Adhesion Sci. Technol., 1997, pp. 905-1009, v. 11, No. 7, VSP.

* cited by examiner

*Primary Examiner*—Kuo-Liang Peng
(74) *Attorney, Agent, or Firm*—Klarquist Sparkman, LLP

(57) ABSTRACT

A mixture for forming a coating on a surface includes a metal alkoxide having the chemical formula $Si(OR^1)_4$, $OR^1$ being a hydrolysable group, an organoalkoxysilane having the chemical formula $R^2_x SiOR^1_{(4-x)}$, $R^2$ being an epoxy group and x being an integer from 0 to 3, a silica filler, and an organic acid for promoting hydrolysis and cross-linking the metal alkoxide and the organoaloxysilane. A coating on the surface is formed by depositing the mixture on the surface to form an under layer and depositing an outer layer comprising primarily a radiation activated self-cleaning material on the under layer. The radiation activated self-cleaning material can include titanium dioxide ($TiO_2$) particles at least partially in anatase form.

31 Claims, 8 Drawing Sheets

COATING SURFACE

CROSS-REFERENCE TO RELATED APPLICATON

This application claims the benefit of U.S. provisional patent application Ser. No. 60/498,605, entitled "An inorganic or organic under layer for solar driven photocatalytic self-cleaning coating for exterior painted surfaces," filed Aug. 29, 2003, which is incorporated herein by reference.

FIELD OF THE INVENTION

The present invention relates generally to coating surfaces, and more particularly to radiation activated self-cleaning coatings, and under-layers, mixtures and methods for coating surfaces.

BACKGROUND OF THE INVENTION

Radiation activated self-cleaning coatings, such as photo-catalytic coatings, can be used for many applications. For example, such a coating formed on an exterior surface of a building is able to kill bacteria or oxidize organic pollutants.

A known type of self-cleaning coating is one that contains a metal oxide such as titanium dioxide ($TiO_2$). When the coating is exposed to an electromagnetic radiation having energy larger than the band gap (between the conduction band and the valence band) of the metal oxide, electrons in the valence band can be excited to the conduction band, leaving a positively charged hole in the valence band. The photoexcited holes have the ability to cause oxidation reactions and the electrons have the ability to cause reduction reactions. Unless they re-combine among themselves, these photoexcited holes and electrons tend to move to the surface to induce oxidation-reduction. The chemical species in their vicinity will therefore be either oxidized or reduced. For example, a hole may oxidize a water molecule ($H_2O$) to yield an OH; and an electron may reduce oxygen to a superoxide anion ($O_2^-$) or a hydrogen peroxide ($H_2O_2$). As reactive oxygen ($OH.H_2O_2$ and $O_2^-$) have very strong reactivity, they will break down large organic pollutants, completely mineralizing most organic compounds (including bacteria), and leaving carbon dioxide and water as products. The resulting products can be easily washed away. With rain-wash, this type of coatings exhibit self-cleaning cleaning effects.

A radiation activated surface can be utilized in many applications such as anti-bacteria, anti-fogging, deodorization and water purification applications.

The self-cleaning material such as $TiO_2$ particles can be deposited directly on many inorganic substrates because these substrates, such as tiles and glasses, are resistant to photochemical reaction from the photo-catalytic coating. Typically, the $TiO_2$ particles are deposited on the substrates and are then sintered at temperatures of several hundreds of degrees Celsius. A disadvantage of such a technique is the requirement to heat to very high temperatures.

The $TiO_2$ particles can also be immobilized on the substrate on top of an under layer, or a binder. Example inorganic under layers or binders include water glass, silicate coating, silicone rubber and fluorinated polymer. Inorganic binders can be generated by hydrolysis of metal alkoxide precursors, for example, the hydrolysis of tetra ethoxyl silicate can produce silica binder. Example organic binders include polytetrafluoroethylene (PTFE), silicon resin, acrylate resin and melamine resin.

The use of under layers or binders can be advantageous in cases where the substrates, such as some polymeric substrates, can be damaged by the reactions activated by radiation, or where the self-cleaning material does not adhere well to the substrate directly.

The conventional techniques using under layers or binders, however, also have certain drawbacks.

Some inorganic binders and under layers have limited critical (defect-free) thickness especially when their precursors have four hydrolysable functional groups. Dip and spin coating are typically the only suitable methods for depositing these binders or under layers on the substrate. When the precursors for the binder or under layer contain less than four functional groups, the adhesion to the substrate is poor. Further, the resulting coating generally needs to be cured at temperatures higher than 200° C. Organic substrates may be deformed or damaged at such high temperatures.

A disadvantage of conventional organic binders is that they tend to reduce the photo-catalytic activity of the photo-catalytic particles. Another problem is that the organic binder can be gradually oxidized if the coating is exposed to radiation such as sun light for a long period of time.

Accordingly, there is a need for improved processes and materials for forming radiation activated self-cleaning coatings.

SUMMARY OF THE INVENTION

In one aspect of this invention, there is provided a method of coating a surface, comprising a) obtaining a mixture including (i) a metal alkoxide having the chemical formula $Si(OR^1)_4$, $OR^1$ being a hydrolysable group, and (ii) an organoalkoxysilane having the chemical formula $R^2_x SiOR^1_{(4-x)}$, $R^2$ being an epoxy group and x being an integer from 0 to 3; depositing, on the surface, a layer comprising the mixture.

In another aspect of this invention, there is provided a coating formed in accordance with the method described in the above paragraph.

In another aspect of this invention, there is provided a mixture for forming an under layer of a radiation activated self-cleaning coating, comprising (a) a metal alkoxide having the chemical formula $Si(OR^1)_4$, $OR^1$ being a hydrolysable group; and (b) an organoalkoxysilane having the chemical formula $R^2_x SiOR^1_{(4-x)}$, $R^2$ being an epoxy group and x being an integer from 0 to 3.

In another aspect of this invention, there is provided an under layer for a radiation activated self-cleaning coating, which is formed using the mixture described in the above paragraph.

In another aspect of this invention, there is provided a coating on a surface of an object, comprising: (a) an inert under layer adhered to the surface, comprising a polymeric siloxane network, opened epoxy rings, and a silica filler; and (b) a self-cleaning outer layer formed on said under layer, comprising titanium dioxide ($TiO_2$) particles.

Advantageously, the radiation activated self-cleaning coatings so formed can be cured at relatively low temperatures. Further, the under layer can prevent the underlying substrate surface from being damaged as a result of its photochemical reaction. The under-layer also facilitates the formation of a self-cleaning layer on existing structures such as exterior building walls by spray coating. The final coating can have good mechanical properties, such as excellent adhesion and crack-free, and a desirable self-cleaning ability, with both high photo-catalytic reactivity and high hydrophilicity.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate exemplary embodiments of the invention.

DETAILED DESCRIPTION OF EXEMPLARY EMBODIMENTS

Figure 1:
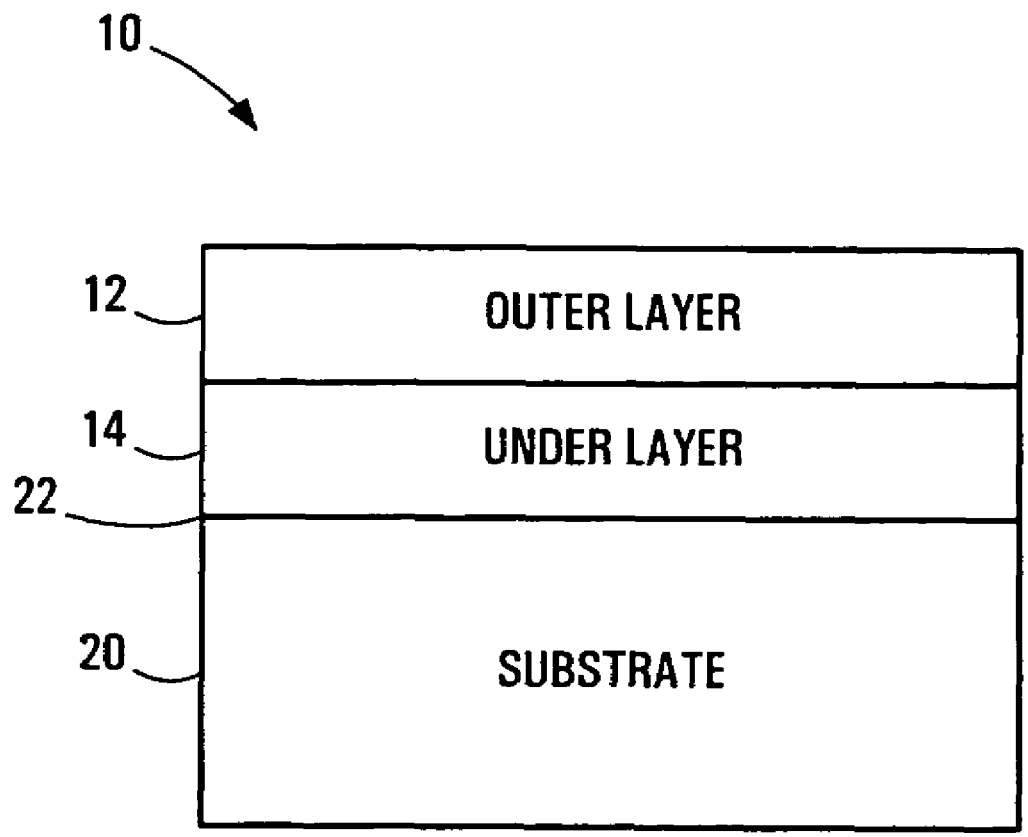
FIG. 1 illustrates schematically a coating formed on a substrate.

FIG. 1 illustrates schematically a coating 10 formed on a substrate 20, exemplary of embodiments of the invention. The coating 10 comprises an outer layer 12 and an under layer 14 sandwiched between the outer layer 12 and the substrate surface 22.

The outer layer 12 is made of a radiation activated self-cleaning material. A radiation activated self-cleaning material is a material that, under radiation such as sunlight, can spontaneously react with a foreign substance in contact with its surface so as to break down the substance. As a result, large substances will break down, loosening their adhesion—such that they easily wash away. The radiation activated self-cleaning material thus produces a cleaning effect under radiation. A cleaning effect is one that can facilitate the maintenance of the material surface in a desirable condition. The surface can be self-maintaining or maintainable at reduced frequency and labour, or both. For example, rendering a foreign substance adhered to the surface less adhesive to the surface is a cleaning effect: the less adhesive foreign substance can be washed away more easily than before. Rendering the coating surface resistant to certain chemicals can also be a cleaning effect. Other example cleaning effects include anti-bacterial, anti-microbial, anti-fogging, quick drying, uniform drying, dirt removing, anti-spotting, anti-tarnish, anti-decolouring, anti-hazing, anti-stain, and deodorizing effects, or the like. Example radiation activated self-cleaning materials include photo-catalytic metal oxides, such as titanium dioxide ($TiO_2$) particles, or $ZnO_2$, $SnO_2$, $BaTiO_3$, $ZrO_2$, CdS, CdSe, $Nb_2O_5$, $Fe_2O_3$ particles or their mixtures. To be effective, the thickness of the outer layer 12 should be in between about 0.1-2 µm, preferably about 0.3-0.8 µm.

The under layer 14 is inert to radiation. Its surface adjacent to the outer layer 12 is also inert or resistant to the chemical reactions activated by radiation of the outer layer 12 or the products of such radiation activated chemical reactions. The surface of the under layer 14 adjacent to the substrate surface 22 has good adhesive properties so that it binds well to the substrate surface 22. The under layer 14 may contain sufficient epoxy groups which tend to react with substrate surface 22, so as to provide good adhesion.

The under layer 14 can typically have a thickness between about 0.5-5 µm, preferably about 1-3 µm.

The under layer 14 provides good adhesion and a good foundation for the outer layer 12, thus facilitating the formation of a self-cleaning layer on existing structures such as exterior building walls. The under layer 14 provides smooth coating by simply brush, spray or spin coating. The under layer 14 can also prevent the substrate surface 22 from being damaged, for example, as a result of photochemical reaction. It can be made by adding colouring pigment to produce different colours.

Substrate 20 may be an organic substrate and may be formed by, for example, coating an organic material on a conducting metal. Thus, substrate 20 may be a paint-coated aluminum metal, preferably a fluorocarbon painted on aluminum panel and can be in any suitable form or shape. For example, the substrate can be the whole or part of an object. The object can be large or small. It can be an article such as an integrated circuit chip or a structure such as a building. The substrate surface 22 may be flat or contoured. Optionally, under layer 14 can be directly applied onto an aluminum substrate. It may have different colours and function just like a paint. In other words, it can be used to replace conventional paint.

Figure 2:
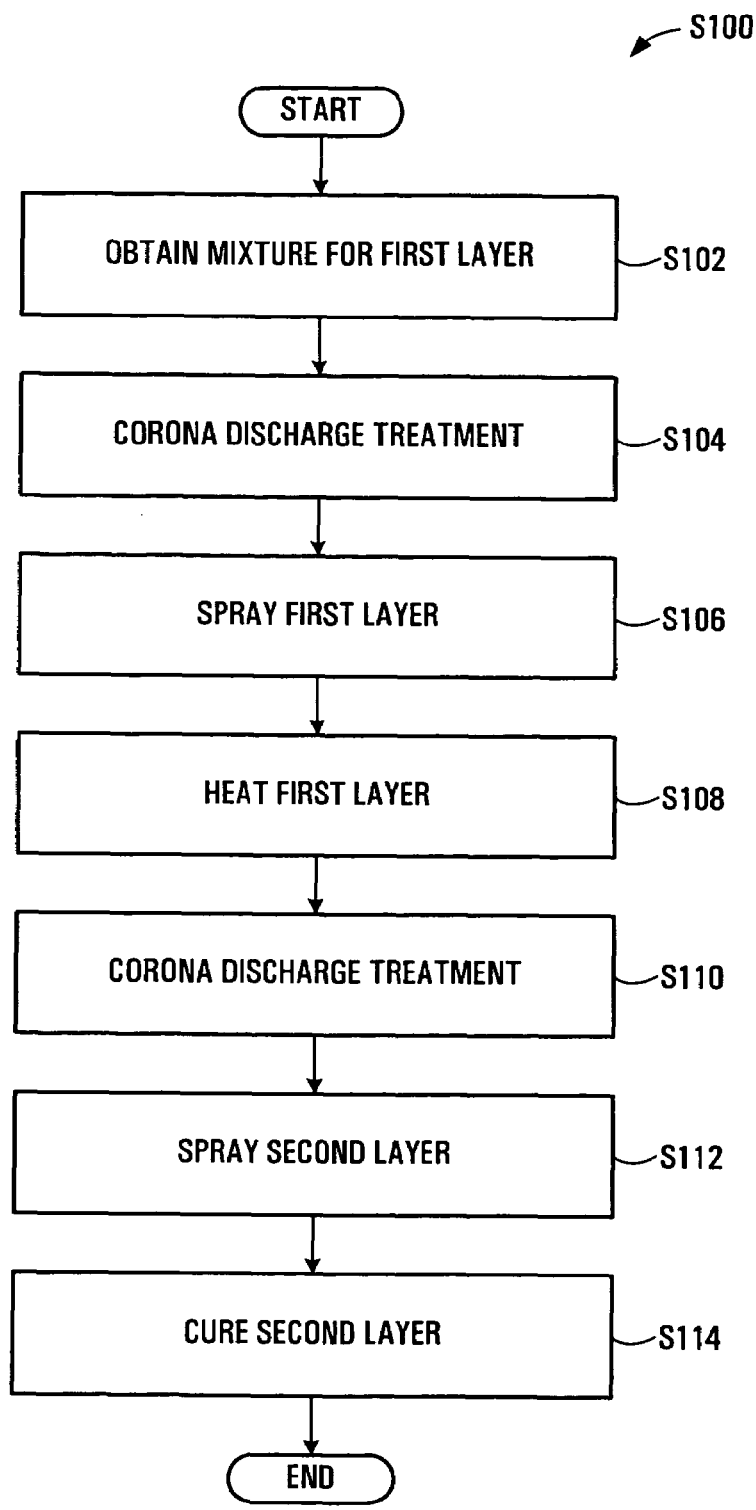
FIG. 2 is a flowchart illustrating an exemplary process for forming the coating of FIG. 1.

FIG. 2 illustrates an exemplary process S100 for forming the coating 10.

At S102, a mixture for the under layer 14 is obtained.

The mixture contains the precursors of the under layer 14 and includes the following:

(1) metal alkoxide having the chemical formula $Si(OR^1)_4$, $OR^1$ being a hydrolysable group (2) organoalkoxysilane having the chemical formula $R^2_x SiOR^1_{(4-x)}$, $R^2$ being an epoxy group and x being an integer from 0 to 3

(3) silica filler (4) organic acid for promoting hydrolysis and cross-linking the metal alkoxide and organoaloxysilane.

The mixture is a liquid and can be a sol-gel solution. It may optionally contain a solvent having a boiling temperature higher than 120° C. The solvent assists in providing a uniform coating and prevents the final coating from cracking. For example, the boiling temperature may be between about 80° C. to about 130° C. As can be appreciated by a person skilled in the art, the mixture in liquid phase may include a substantial amount of water. For example, the sol-gel solution may contain up to about 75% water by weight.

An example of the metal alkoxide is tetraethoxysilicate (TEOS). Other metal alkoxides or organo-metal compounds could be used.

An example of the organoalkoxysilane is trimethoxysilane (GPTS) but other organoalkoxysilanes could be used. The epoxy functional groups provide good adhesion to various types of substrates including organic substrates.

The molar ratio of the metal alkoxide and the organoaloxysilane can vary between about 1:1 to about 1:8. The molar ratio of the metal alkoxide and the organic acid can vary between about 5:1 to about 2:1.

The silica filler can include $SiO_2$ particles sized between about 2 to about 100 nm. The weight ratio between the organoalkoxysilane and the silica filler can be between about 30:1 to about 1:10, or between about 5:1 to about 1:2.

The mixture is hydrolysed, for example, by stirring for 3 to 5 days. The organic acid slowly promotes hydrolysis. The hydrolysed solution can be used for a certain period before reaching gelation. Adding more water and a strong acid (HCl, $HNO_3$) in the mixture can promote the hydrolysis process. However, doing so can cause condensation, which ultimately results in geling of the solution.

It is advantageous if the sol-gel solution has a pH value in the range of about 3 to about 4, as will be further discussed below.

At S104, the substrate surface 22 may be subject to corona discharge to increase its surface tension so as to improve the surface's adhesion property. The treatment conditions can be readily determined by a person skilled in the art for a given application. For example, the treatment voltage may be about 10 kV and the power may vary from 1 to 10 kW. The substrate surface 22 may also be subject to other treatments such as exposure to ultraviolet (UV) light or ozone or plasma treatment. These treatments might give similar results but conora treatment is easier to perform.

The substrate surface 22 may also be otherwise treated, e.g. oxidized, in manners known to a person skilled in the art.

At S106, the mixture is deposited, such as by spraying, on the substrate surface 22 to form the under layer 14. The mixture may be sprayed in manners known to a person skilled in the art. The mixture may also be deposited on the substrate surface 22 in other suitable manners known to a person skilled in the art.

At S108, the under layer 14 is heated at a sufficient temperature, for example, 80° C. The heat treatment partially cures the under layer. Partially curing the under layer is advantageous because it prevents the outer layer, such as the photo-catalytic $TiO_2$ particles, from sinking into the under layer before the coating is fully cured. With partial curing, the outer layer will remain at the very top of the coating before it is cured.

At S110, the under layer 14 is optionally subjected to corona discharge treatment, which can be carried out in similar conditions as described above at S104.

At S112, the outer layer 12 is deposited, such as by spraying, on the under layer 14.

The outer layer 12 may include $TiO_2$ particles at least partially in anatase form, which can be formed by treating normal $TiO_2$ particles with a hydrogen peroxide to form a clear $TiO_2$ complex. The $TiO_2$ particles may have sizes in the range of about 1 to about 100 nm. The size of particles refers to their average or effective size. The particles could be crystallized by high pressure (for instance, autoclave) treatment before use. In some applications, it is advantageous to have $TiO_2$ particles sized in the range of about 2 to about 20 nm, for example, to give better transparency for a glass substrate. The outer layer 12 may include other materials as dopants. For example, it may include a metal selected from the group consisting of V, Fe, Co, Ni, Cu, Zn, Ru, Rh, Pd, Ag, Pt, and Au. Doping the outer layer 12 with one or more of these metals can greatly improve its photo-catalytic efficiency.

At S114, the coating 10, including both the outer layer 12 and the under layer 14, is cured at a suitable temperature. For example, the coating 10 may be cured at room temperature, or, by heating, at a temperature below 150° C.

To further illustrate, a specific example process and the resulting example coating are described below.

Figure 3A:
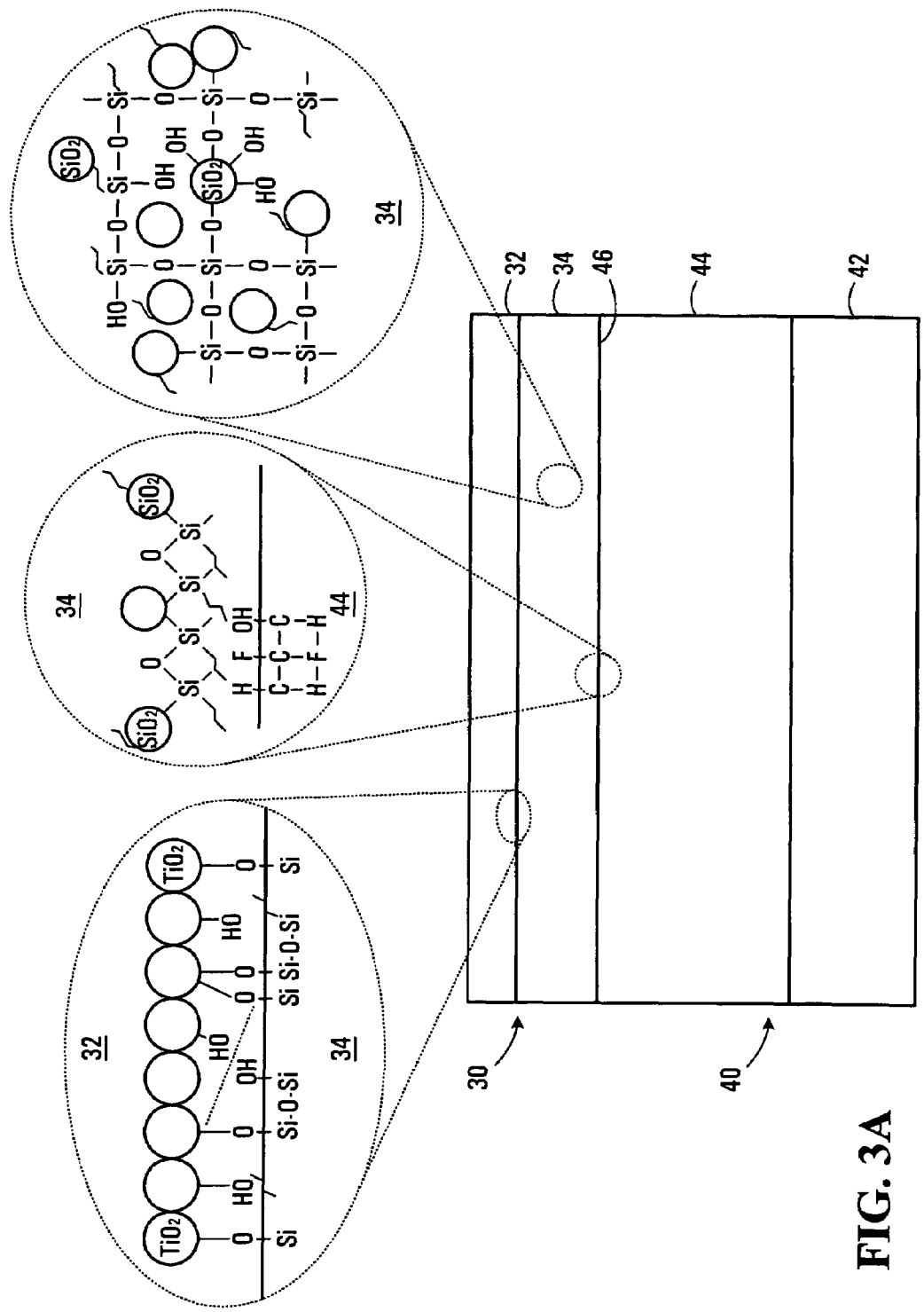
FIG. 3A illustrates schematically an example coating and the chemical structures in various regions of the coating, which is formed by the process of FIG. 2.

FIG. 3A illustrates schematically the example coating 30 formed on a painted substrate 40. The example coating 30 includes an outer $TiO_2$ layer 32 and under layer 34. The substrate 40 was made of an aluminium base 42 and a fluorocarbon paint cover 44 with a paint surface 46.

The example mixture used for forming the under layer 34 was a sol-gel solution consisting essentially of TEOS, GPTS, silica particles, itaconic acid, 1-methoxy 2-propanol, and water, with their molar ratios being, in the above order, 1.63:1:3.95:0.39:6.41:39.48.

To prepare the example mixture, a few drops of GPTS were added to a suspension of colloidal silica particles (sold under the name Ludox™ TM40), with a surface area of about 140 $m^2/g$, a pH value of about 9.0, and particle sizes of about 10 to about 20 nm. The GPTS modified suspension was then mixed with the aforementioned other components to form the mixture. The mixture was stirred for 3-5 days before use. The final pH was about 4.

The paint surface 46 was subject to corona discharge at the following conditions: discharge voltage=10 kV, power=500 W.

The mixture was sprayed onto the paint surface 46 from a distance of 60 cm at a speed of 20 ml/min to form the under layer 34. The desired coating thickness was controlled by repeated spraying.

The substrate 40 and the coated layer 34 of the mixture were dried at 80° C. for 10 minutes and then subject to corona discharge treatment, as described above.

A $TiO_2$ suspension was acquired from Tiotechno Co., which was composed of $TiO_2$ particles of 10 nm average diameter size dispersed in 2% water by weight The $TiO_2$ suspension was sprayed onto the layer 34, in similar manner as described above.

The final coating 30 and the substrate 40 were heated at about 80° C. for about 30 minutes.

Figure 4A:
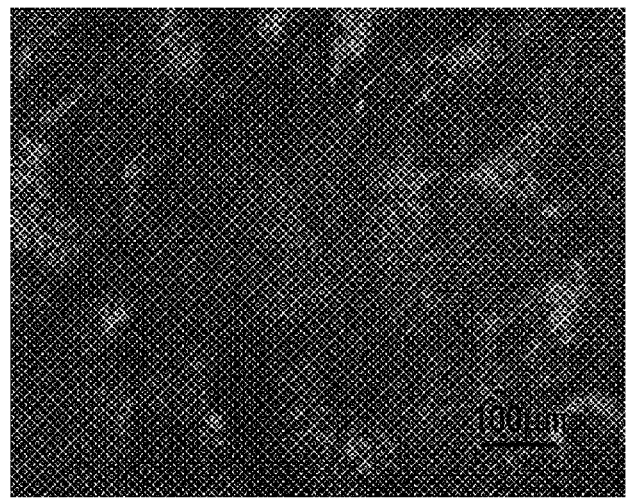
FIG. 4A shows an optical microscope image of the example coating of FIG. 3A.
Figure 4B:
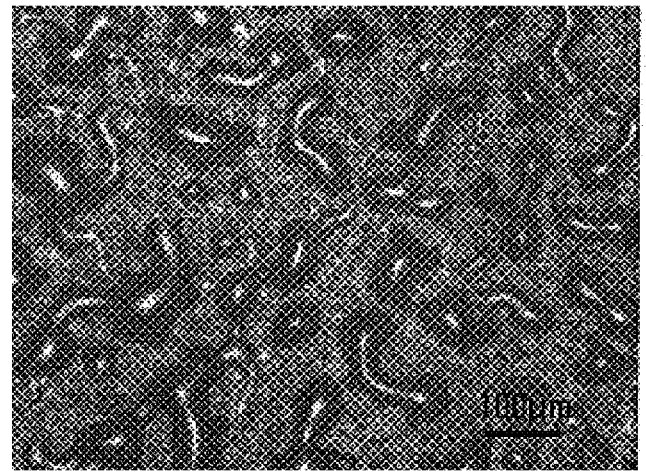
FIG. 4B shows an optical microscope image of a comparison coating which has no under layer.

Test results showed that the $TiO_2$ layer 32 was substantially crack free as can be seen in FIG. 4A, which shows an image of the $TiO_2$ layer 32 obtained using an optical microscope at 100 times magnification. In comparison, visible cracks were observed on a $TiO_2$ coating formed directly on a painted aluminium substrate without an under layer, as shown in the image of FIG. 4B. These tests were performed immediately after coating.

Figure 5A:
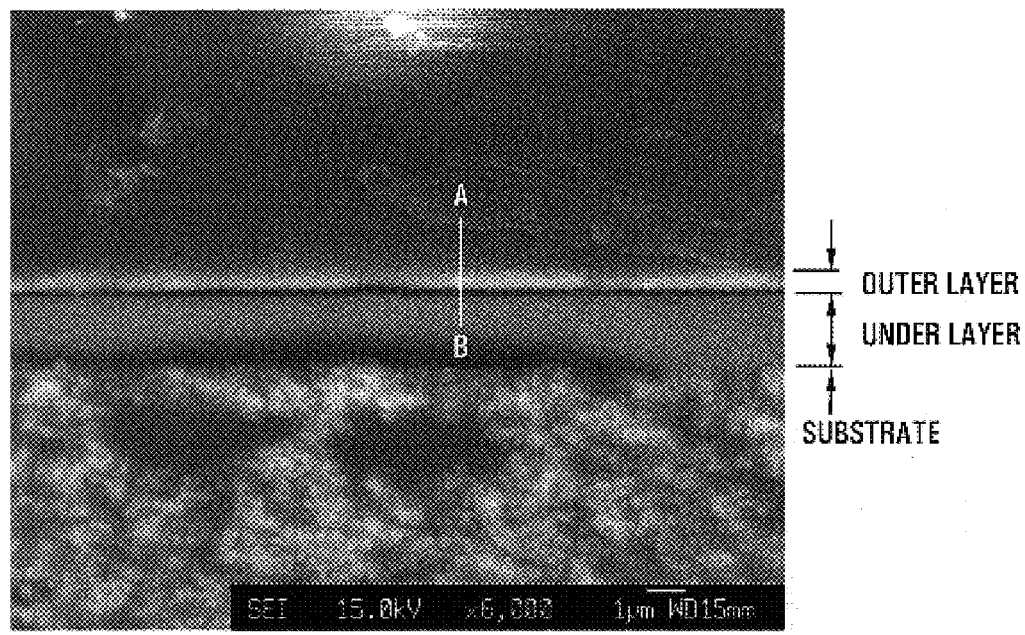
FIG. 5A shows a Scanning Electron Micrograph (SEM) image of the example coating of FIG. 3A.

The result of an X-ray Diffraction (XRD) analysis of the coating 30 suggested that the $TiO_2$ in the final coating 30 is in the anatase form. A measurement by Scanning Electron Microscopy showed that the under layer 34 was about 1.2 μm thick and the outer layer 32 about 0.3 μm thick. A cross-sectional image of the coating is shown in FIG. 5A.

Figure 5B:
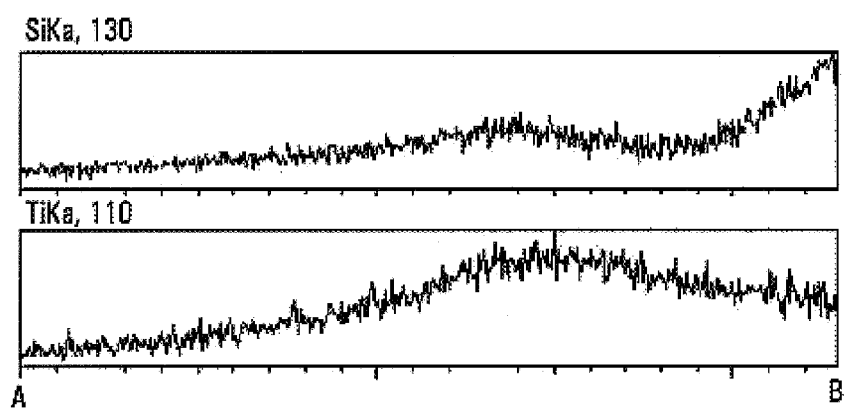
FIG. 5B shows two elemental line scans of energy dispersive X-ray (EDX) analysis for Si and Ti along the line "A" to "B" in FIG. 5A.

The results of an Energy Dispersive X-ray (EDX) analysis of the coating 30 are shown in FIG. 5B. The scans were performed across the interface between the outer layer 32 and the under layer 34 from point A to point B as shown in FIG. 5A. The top graph shows the resonance line for Si. The bottom graph shows the resonance line for Ti. As can be seen, the Ti and Si contents respectively peaked on the respective sides of the interface.

Figure 3B:
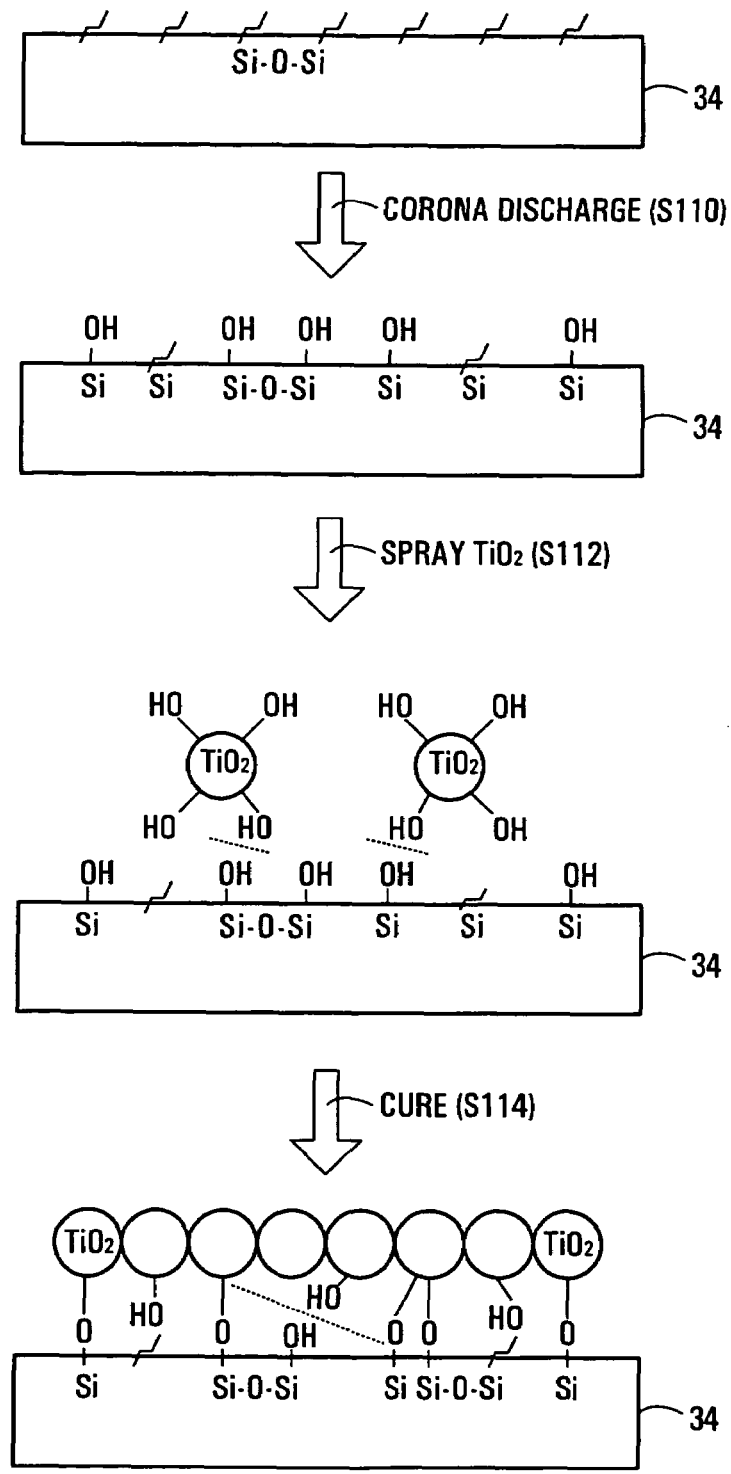
FIG. 3B illustrates the change in bonding structures at the interface of the outer and under layers of the coating of FIG. 3A during the forming process.

Without being limited to a particular theory, the following is one possible explanation for the observed property of the coating 30, with reference to FIG. 3B and to the structures in the circles of FIG. 3A. The chemical structure of the under layer 34 is likely as illustrated in the right circle of FIG. 3A, where the short, solid straight lines represent bonds between chemical species and the short curved lines represent opened epoxy rings. As can be understood, the under layer 34 includes a polymeric siloxane network, opened epoxy rings, and a silica filler. The good adhesion of the example coating 30 is likely attributable to the interaction between the opened epoxy rings from the hydrolysed GPTS in the under layer 34 and the polymer paint surface 46, as illustrated in the middle circle of FIG. 3A. The bonding structure at the interface of the outer layer 32 and the under layer 34 is likely as illustrated in the left circle of FIG. 3A.

It can be appreciated that the alkyl groups from the GPTS tend to move to the surface due to its lower surface energy. The under layer 34 is thus expected to have a structure illustrated at the top of FIG. 3B when it is initially formed on the paint surface 46, where the short curved lines again represent the opened epoxy rings. As can be understood, epoxy rings tend to open up in liquids having pH values in the range of about 3 to about 4. Upon corona discharge treatment (S110), most of the alkyl groups from the GPTS are decomposed and hydroxyl groups are formed. When the $TiO_2$ layer 32 is formed and cured on the under layer 34 (S112 and S114), the two layers bind through Si—O—Ti bonds formed from the hydroxyl groups or through hydrogen bonding to the surface hydroxyls, as illustrated at the bottom of FIG. 3B.

To test the example sample (i.e. coating 30 on painted cover 44) against comparison samples (namely, an un-treated painted surface and painted surfaces coated with other coatings), the samples were exposed to both sunlight and UV light. The latter was carried out with a method known as Xenon UV Accelerated Testing. The testing simulated natural sunlight and rainfall under accelerated conditions (UV A: 85 W/m$^2$; humidity: 75±5%). The exposure experiments were conducted simultaneously on all the samples. The samples were examined after exposure for damages such as cracks, colour changes, gloss losses, hardness changes, and changes in self-cleaning ability (as indicated by photo-catalytic oxidation activity). The results are summarized in Table I and shown in FIGS. 6A to 7B.

TABLE I

Surface properties after Xenon Ultraviolet (UV) Accelerated Testing

| Sample | Crack | Discolouring ΔE | Gloss retention | Adhesion | Hardness |
|---|---|---|---|---|---|
| I. Painted surface without coating | No | 1.4 | 99.9% | 5B | 2H |
| II. painted surface coated directly with $TiO_2$ layer | Yes | 3.3 | 27.6% | Chalking | Unable to measure due to chalking |
| III painted surface coated with under layer only | No | 1.9 | 102.8% | 5B | 4H |
| IV Painted surface coated with Coating 30 | No | 3.3 | 98.2% | 5B | H |

Optical images of the coatings were visually examined for cracks.

The Discolouring results were measured using a Datacolor Microflash Portable Color Spectrophotometer based on the average of six replicates showing coefficients of standard variation: $\Delta E=(\Delta L^2+\Delta a^2+ \Delta b^2)^{1/2}$, where L, a and b refer to the test specimen. The measurement angle was 10 degrees.

The Gloss retention results were measured using an Erichsen Pico-Glossmaster 500 based on the average of six replicates, where Gloss retention=$Gloss_{before\ test}$/$Gloss_{after\ test}$, at a measurement angle of 60 degrees.

The adhesion results were measured using removal percentage. Ten cross cuts were made to each sample coating. The cross cuts were covered with an adhesive tape, which was subsequently removed. The percentage of coating removed with the tape was measured using the American Society for Testing and Materials (ASTM) standard D3363-00. Specifically, 5B indicates about 0% of removal.

The hardness was measured according to ASTM D3359-97. The pencil was held firmly against the sample coating at a 45° angle and pushed away from the operator in a 6.5 mm stroke. The listed hardness grades indicate the highest hardness grades of pencils that did not scratch the sample coatings.

The testing for Sample II was terminated after 40 hours of exposure due to cracking and lost of gloss. As indicated in Table I, cracks appeared and gloss retention dropped to 27.6% after 40 hours of exposure to radiation.

In contrast, after about 1,000 hours of exposure to radiation equivalent to outdoor exposure to sunlight for about 1.5 years, Sample IV showed no cracking, nor significant discolouring or loss of gloss. The results indicate that the under layer 34 is an effective barrier for preventing the paint surface from being attacked by the photochemical reactions occurring in the $TiO_2$ layer.

The hardness of Sample IV decreased somewhat from 2H before the testing to 1H after the testing. However, the coating should still be sufficiently durable for many applications, particularly in view of the reduced wear due to the reduced maintenance requirement.

The self-cleaning effects of the sample coatings were determined using two methods: (1) measurement of the photo-catalytic oxidation ability to destroy pigment indicator, and (2) measurement of the water contact angle (θ).

Figure 6A:
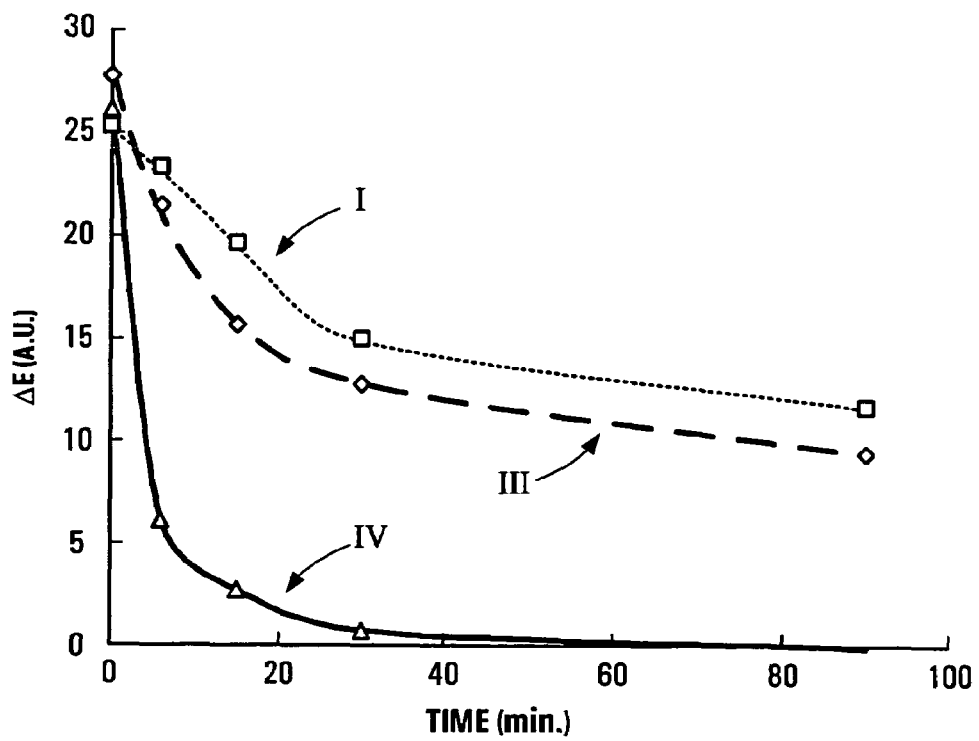
FIGS. 6A and 6B are diagrams showing the test results of colour change under radiation for various coatings.

FIG. 6A shows the results of tests carried out according to the method (1) by exposing the sample coatings sprayed with dirt pigment to sunlight, where colour change (ΔE) is shown as a function of time. As can be appreciated, colour change can indicate the extent of oxidation of the dirt indicator. The results show that dirt indicators on Sample IV (marked "IV") were almost completely oxidized after 30 minutes of exposure, whereas about half of the dirt indicators still remained on Sample I (marked "I") and Sample III (Marked "III"). The decrease in ΔE for the latter two samples can be attributed to the direct solar UV light effect, which, as shown, was insufficient to remove the dirt indicators completely even after about 90 minutes of exposure.

Figure 6B:
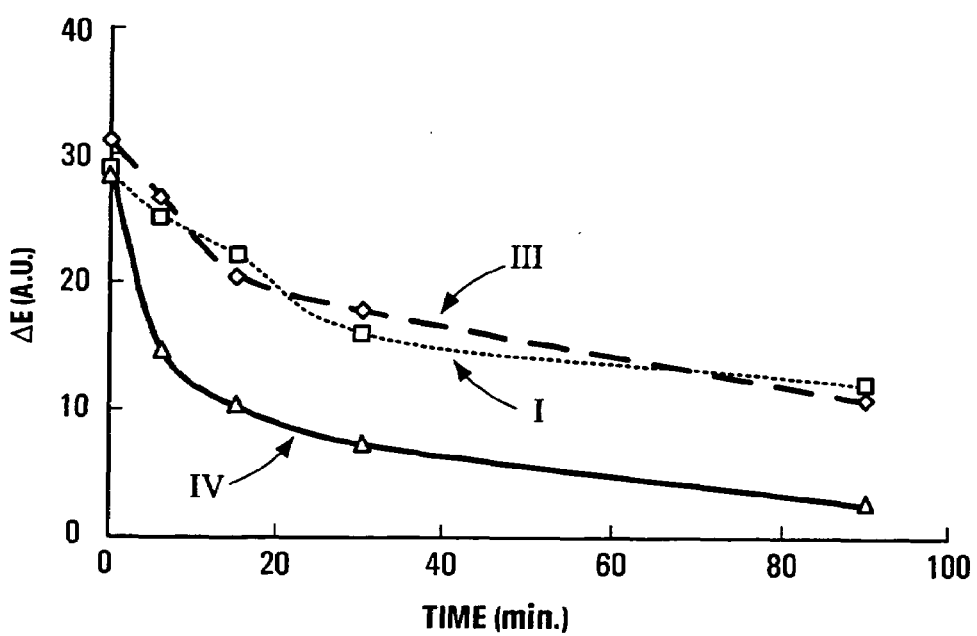

FIG. 6B shows colour change as a function of sunlight exposure after the test samples finished 1000 hours of UV accelerated testing. The samples were sprayed with dirt pigment, and exposed to sunlight. Colour change in Sample IV was again larger than those in Samples I and III. The light exposure under 1000 hours of UV accelerated testing is equivalent to about 1.5 years of normal sunlight exposure in Singapore, where the tests were conducted.

Figure 7A:
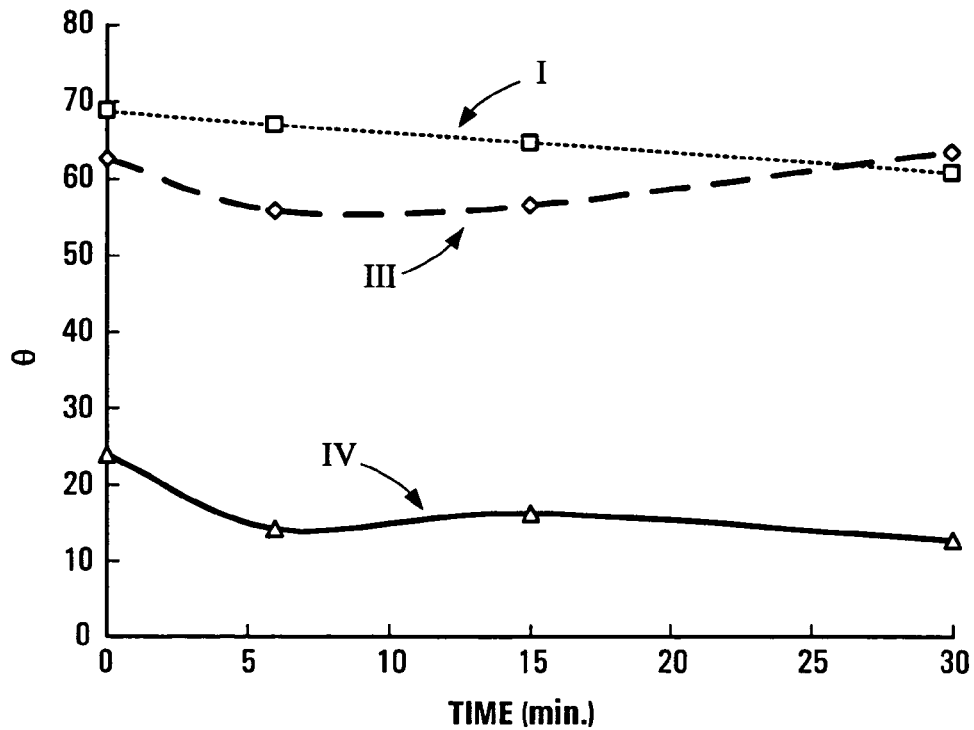
FIGS. 7A and 7B are diagrams showing the results of water contact angle measurements for various coatings.

FIG. 7A shows the results of water contact angle measurements. As can be appreciated, the water contact angles indicate the hydrophilicity of the surface: the lower the contact angle, the more hydrophilic the surface. A hydrophilic surface is easy to clean with water because water spreads well on it. A drastic decrease in θ value was observed on the surface of Sample IV after exposure to radiation. Even without sunlight exposure, the θ value for a very fresh $TiO_2$-sol-gel coating was zero. After keeping freshly prepared samples in the dark for 2~3 days, the θ value went up to 23.9°. However, the θ value dropped again simply by solar irradiation. The change in θ value as a function of time is shown in FIG. 7A. The value of θ was reduced to 14.2° after 5 minutes of solar irradiation, and further decreased to below 10° after 30 minutes of irradiation. Generally speaking, there are at least two reasons for the reduction in contact angle. One is that the surface becomes cleaner due to oxidation reactions induced by radiation. Another is that more OH— groups are formed under light irradiation. Both of these two processes need sunlight to proceed. Tests showed that a freshly prepared $TiO_2$-sol-gel coating exhibits an almost zero water contact angle even without exposure to sunlight, and this super-hydrophilic property can be retained under sunlight irradiation. This is a feature that distinguishes the coating of Sample IV with other coatings. For example, in comparison, the values of θ for Samples I and III remain at around 60° to 70° after exposure to sunlight.

Tests also showed that the water contact angle on the surface of Sample IV was reduced to about 2° after two hours of radiation. In contrast, the same amount of radiation had little effect on the water contact angles of Samples I and III: their θ values remained at about 60 to 70°.

It was surprising that the example coating 30 showed both excellent photo-catalytic and hydrophilic effects. Previous studies on glass suggested that a coating's hydrophilicity is independent of its photo-catalytic activity. (If a coating has good hydrophilicity, but bad photo-catalytic reactivity, dirt can be washed away by its first property, but cannot be oxidized by its photochemical reaction.)

Figure 7B:
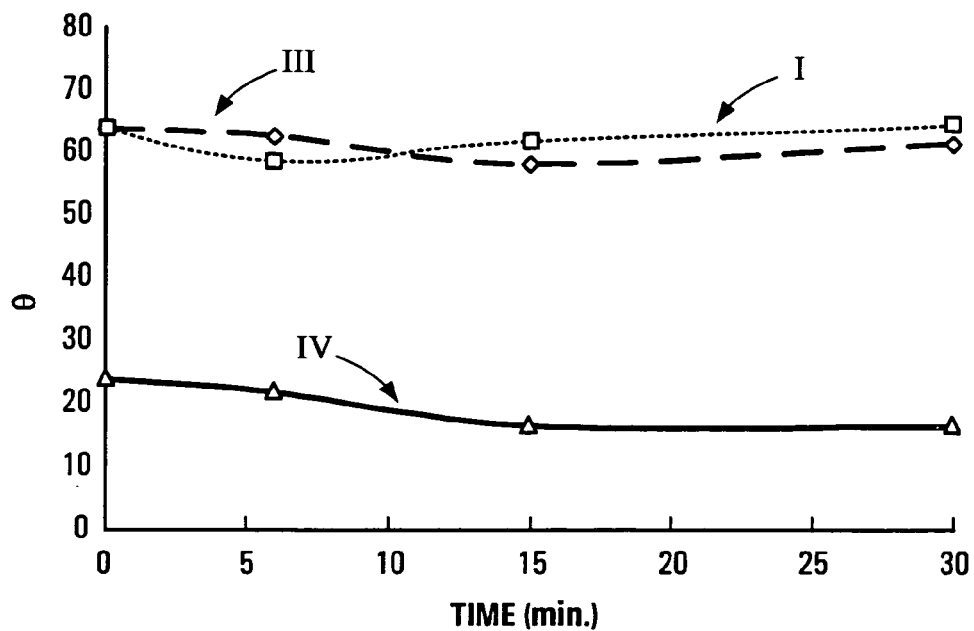

FIG. 7B shows the long-term effect of radiation (after exposure to UV light) on water contact angle, again using an accelerated test method. Sample IV again showed a large decrease in θ value while no significant changes were observed for Samples I and IIII. As can now be appreciated, the coating 10 can have both good self-cleaning and good structural properties and can be formed at relatively low temperatures. The surface can not only have good oxidation abilities but can also be very hydrophilic so that an oxidized foreign substance can be easily washed away from the surface by either rainfall or water spread manually.

As can also be appreciated, in different embodiments, it is possible to have additional layers in the coating 10. For example, it is possible to have more than one under layer. Further, the outer self-cleaning layer does not have to be the outermost layer of the coating. It is possible to have an additional layer on top of the self-cleaning layer. The outermost layer may be transparent, thin and conductive so that radiation can still reach the self-cleaning material to activate the reactions that produce the cleaning effects.

Other features, benefits and advantages of the present invention not expressly mentioned above can be understood from this description and the drawings by those skilled in the art.

Although only a few exemplary embodiments of this invention have been described above, those skilled in the art will readily appreciate that many modifications are possible therein without materially departing from the invention. The invention, rather, is intended to encompass all such modification within its scope, as defined by the claims.

What is claimed is:

1. A mixture for forming an under layer of a radiation activated self-cleaning coating, comprising:
   a metal alkoxide having the chemical formula $Si(OR^1)_4$, $OR^1$ being a hydrolysable group;
   an organoalkoxysilane having the chemical formula $R^2_x SiOR^1_{(4-x)}$, $R^2$ being an epoxy group and x being an integer from 1 to 3;
   a silica filler; and
   an organic acid for promoting hydrolysis and cross-linking said metal alkoxide and organoalkoxysilane;
   wherein the molar ratio of said metal alkoxide and said organic acid is 1.63:0.39.

2. The mixture of claim 1, wherein the weight ratio of said organoalkoxysilane and said silica filler is between about 30:1 to about 1:10.

3. The mixture of claim 2, wherein said weight ratio is between about 5:1 to about 1:2.

4. The mixture of claim 1, wherein the molar ratio of said metal alkoxide and said organoaloxysilane is between about 1:1 to about 1:8.

5. The mixture of claim 1, wherein said silica filler comprises particles sized between about 2 to about 100 nm.

6. The mixture of claim 1, further comprising a solvent having a boiling temperature between about 80° C. to about 130° C.

7. The mixture of claim 6, wherein said boiling temperature is higher than 120° C. and up to about 130° C.

8. The mixture of claim 1, which is hydrolysed.

9. The mixture of claim 1, which is a liquid having a pH value in the range of about 3 to about 4.

10. An under layer for a radiation activated self-cleaning coating, which is formed using the mixture of claim 1.

11. A method of coating a surface, comprising depositing, on said surface, a layer comprising the mixture of claim 1.

12. The method of claim 11, wherein said layer is a first layer, and said method further comprises depositing, on said first layer, a second layer comprising primarily a radiation activated self-cleaning material.

13. The method of claim 12, wherein said radiation activated self-cleaning material comprises titanium dioxide ($TiO_2$) particles at least partially in anatase form.

14. The method of claim 12, further comprising subjecting said surface to corona discharge before said depositing said first layer.

15. The method of claim 12, further comprising subjecting said first layer to corona discharge before said depositing said second layer.

16. The method of claim 12, further comprising heating said first layer before said depositing said second layer.

17. The method of claim 12, further comprising curing said first and second layers.

18. The method of claim 17, wherein said curing comprises curing said first and second layers at a temperature below about 150° C.

19. The method of claim 11, wherein the molar ratio of said metal alkoxide and said organoaloxysilane is between about 1:1 to about 1:8.

20. The method of claim 11, wherein the weight ratio of said organoalkoxysilane and said silica filler is between about 30:1 to about 1:10.

21. The method of claim 20, wherein said weight ratio is between about 5:1 to about 1:2.

22. The method of claim 11, wherein said silica filler comprises particles sized between about 2 to about 100 nm.

23. The method of claim 11, wherein said mixture further comprises a solvent having a boiling temperature between about 80° C. to about 130° C.

24. The method of claim 23, wherein said boiling temperature is higher than 120° C. and up to about 130° C.

25. The method of 11, comprising forming and hydrolyzing said mixture.

26. The method of 12, further comprising forming a sol-gel of $TiO_2$ particles, and wherein said second layer comprises said sol-gel.

27. The method of claim 26, further comprising treating said $TiO_2$ particles with a hydrogen peroxide to form a clear $TiO_2$ complex.

28. The method of claim 26, wherein said $TiO_2$ particles have sizes in the range of about 1 to about 100 nm.

29. The method of claim 26, wherein said $TiO_2$ particles have sizes in the range of about 2 to about 20 nm.

30. The method of claim 13, wherein said second layer further comprises a metal selected from the group consisting of V, Fe, Co, Ni, Cu, Zn, Ru, Rh, Pd, Ag, Pt, and Au.

31. The method of claim 11, wherein said mixture is a liquid having a pH value in the range of about 3 to about 4.

* * * * *